Nov. 25, 1924.
J. KREITZER
1,517,077
BRAKE AND HAULING DEVICE FOR AUTOMOBILES
Filed May 22, 1924
2 Sheets-Sheet 1
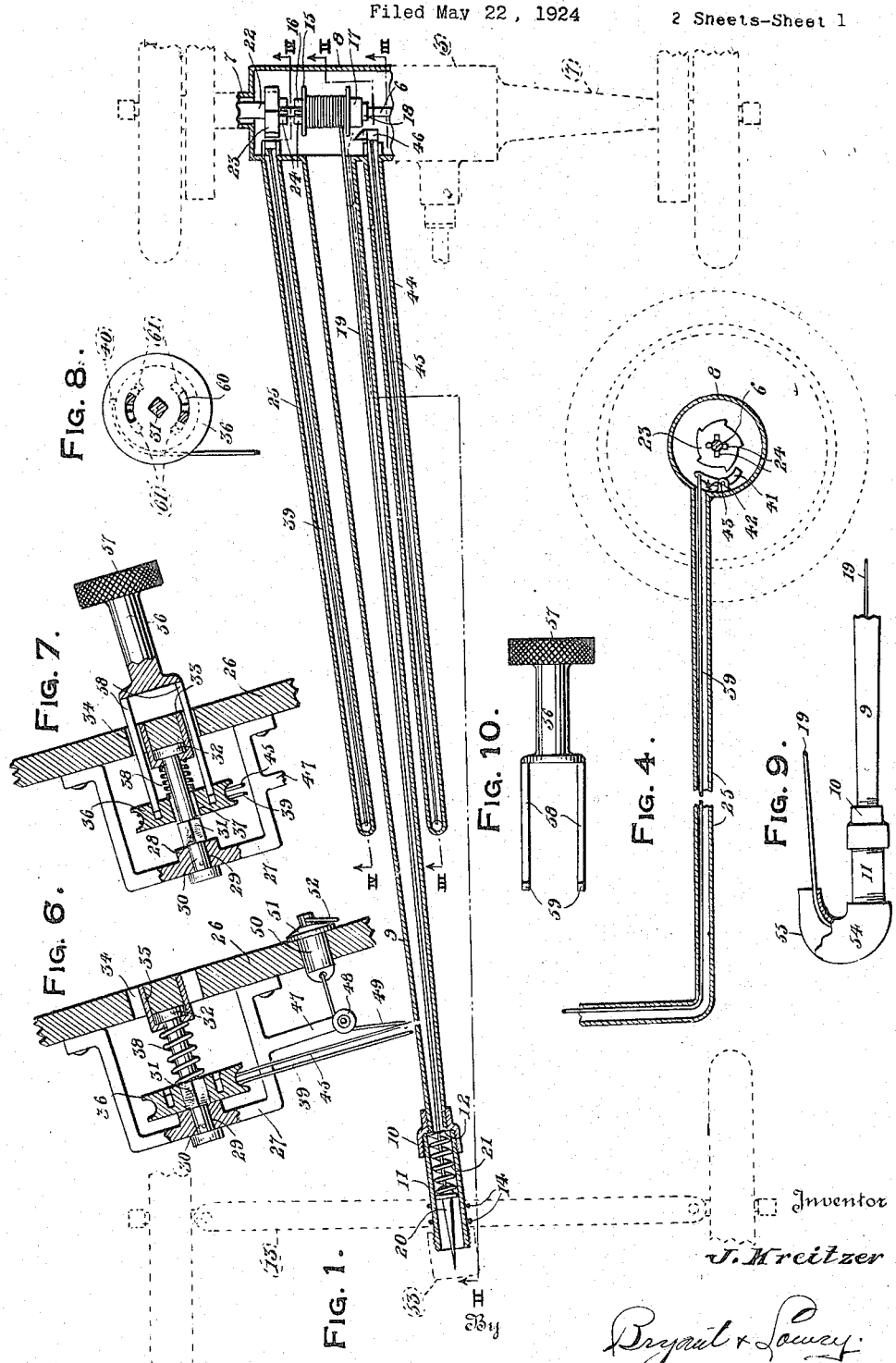

Nov. 25, 1924.
J. KREITZER
1,517,077
BRAKE AND HAULING DEVICE FOR AUTOMOBILES
Filed May 22, 1924 2 Sheets-Sheet 2
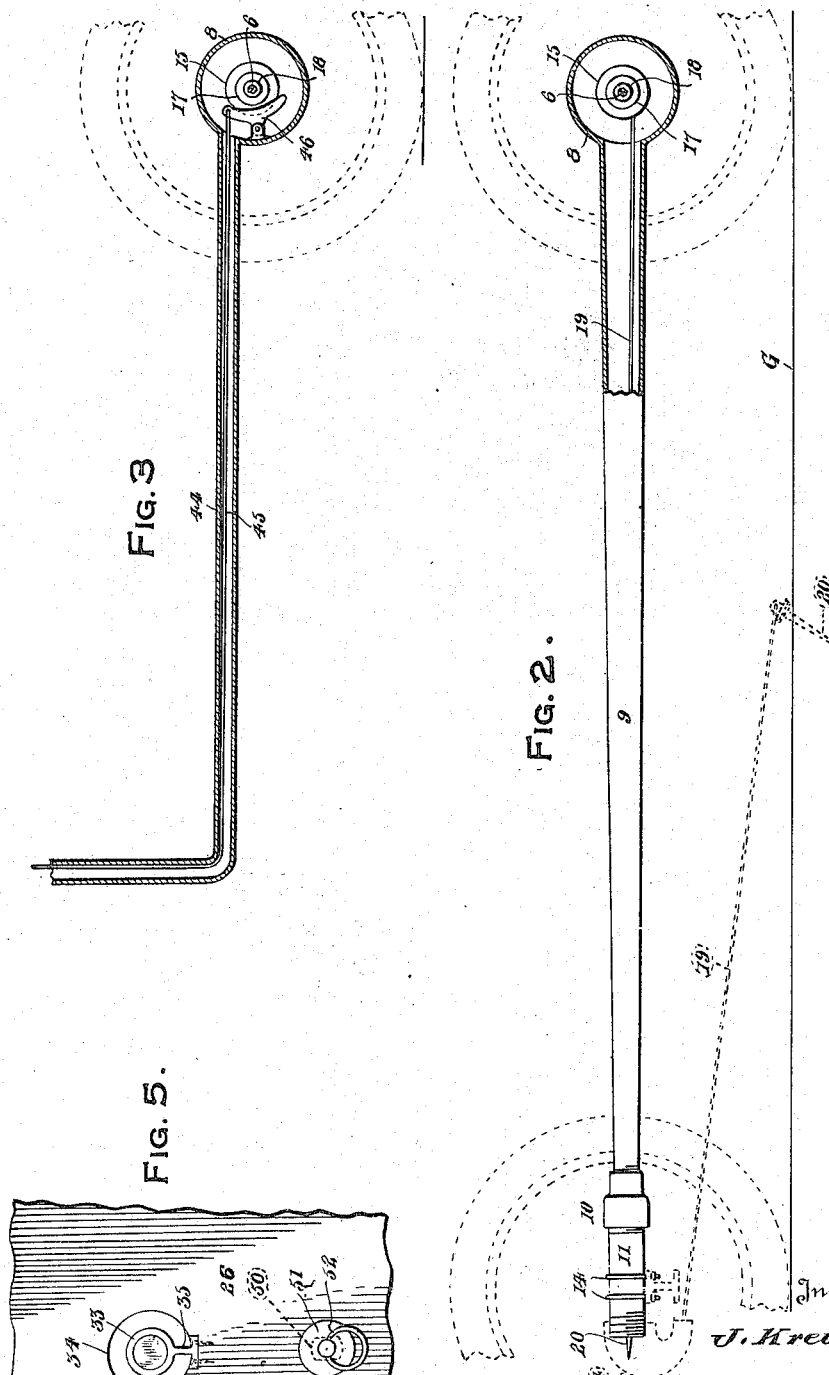

Patented Nov. 25, 1924.

1,517,077

UNITED STATES PATENT OFFICE.

JOHN KREITZER, OF PLUNKETT, SASKATCHEWAN, CANADA.

BRAKE AND HAULING DEVICE FOR AUTOMOBILES.

Application filed May 22, 1924. Serial No. 715,181.

*To all whom it may concern:*

Be it known that I, JOHN KREITZER, a citizen of Canada, residing at Plunkett, in the Province of Saskatchewan and Dominion of Canada, have invented certain new and useful Improvements in Brake and Hauling Devices for Automobiles, of which the following is a specification.

This invention relates to new and useful improvements in brake and hauling devices for automobiles.

An important object of the invention is to provide apparatus which may be used in connection with automobiles for the purpose of braking the speed of travel of the same, locking the vehicle to prevent movement in either direction by an unauthorized person, and hauling the machine out of a mud-hole or the like by its own power.

Other objects and advantages of the invention will be apparent during the course of the following description.

In the accompanying drawings forming a part of this specification and in which like numerals are employed to designate like parts throughout the same, Figure 1 illustrates a partly bottom plan view and partly longitudinal section of the apparatus embodying this invention associated with the front and rear axles of an automobile, Figure 2 is a longitudinal elevational view, partly in section, of a portion of the apparatus illustrated in Fig. 1, and taken upon line II—II of Fig. 1, Figure 3 is a longitudinal sectional view taken upon line III—III of Fig. 1, Figure 4 is a longitudinal sectional view taken upon line IV—IV of Fig. 1, Figure 5 is a fragmentary portion of an automobile dash board showing the points of control of the apparatus illustrated in Figs. 1, 2, 3 and 4, Figure 6 is a fragmentary vertical sectional view of the dash board and the apparatus controls associated therewith, Figure 7 is a fragmentary vertical sectional view of part of the controls illustrated in Fig. 6 and further shows an operating element connected thereto.

Figure 8 is a detail elevational view of a portion of the controlling elements illustrated in Figs. 6 and 7, Figure 9 is a fragmentary elevational view of a cable conduit illustrated in Figs. 1 and 2, and Figure 10 illustrates a detail elevational view of the operating element shown in action in Fig. 7.

In the drawings, wherein for the purpose of illustration is shown a preferred embodiment of this invention, the numeral 5 illustrates the differential housing associated with the rear axle 6 and the rear axle housing 7. Suitably formed with this differential housing 5 and the rear axle housing 7 is a casing 8 which is of cylindrical form and encloses the axle 6.

Formed integrally with the casing 8 and extending longitudinally of the automobile is a tapered conduit 9 having a coupler 10 threadedly connected to its forward end. This coupler 10 is constructed to connect to the outer end of the tapered conduit 9 a section of tubing 11 which is of greater diameter than the forward, reduced end of the tapered conduit 9, thereby forming a shoulder 12. This tubing 11 is connected to the front axle 13 by a pair of U-bolts 14, as best illustrated in Figs. 1 and 2. Loosely mounted upon the rear axle 6 is a drum 15 which is provided at one end with a series of lugs 16 that are intended to be used as a portion of a clutch structure. The drum 15 is provided at its opposite end with a hub portion 17 having a reduced projection 18 extending concentrically therefrom. A cable 19, formed of non-elastic material, is intended to be wound upon the drum 15, with its inner end secured to said drum, and extends longitudinally through the tapered conduit 9 for the purpose of having secured to its outer end a spike 20. Encircling the cable 19 is a spring 21 that bears at its outer end against the head of the spike 20 and at its inner end against the shoulder 12. It will be seen that this spring 21 normally retains the point of the spike 20 projecting from the end of the tubing 11.

Rigidly secured to the rear axle 6 is a sleeve 22 which carries a ratchet wheel 23 and has projecting from one side thereof a series of lugs 24 which are intended to cooperate with the lugs 16 carried by the drum 15 for forming a complete clutch structure.

Extending forwardly from the casing 8 and communicating therewith is an L-shaped conduit 25 which has its upper end terminating in proximity to the dash board 26 of the automobile. Secured to the rear face of the dash board 26 is a U-shaped bracket 27 having a boss 28 formed therewith. This boss 28 is provided with a bore 29 within which a stub shaft 30 is keyed or otherwise secured for preventing rotation. This shaft 30 is provided with an enlarged, squared portion 31 which is positioned in proximity to the outer face of the boss 28. The enlarged end 32 of this shaft 30 is received within a cup-shaped bracket 33 which is secured within a relatively large opening 34 formed in the dash board by means of a leg 35 which is secured to the said dash board. Slidably mounted upon the shaft 30 is a grooved wheel 36 which is provided with a squared bore 37 adapted for snugly fitting the squared portion 31 of the shaft and for loosely engaging the remaining portion of the latter. Encircling the shaft 30 and bearing against the grooved wheel 36 and the inner end of the cup-shaped bracket 33 is a compression spring 38 which normally operates for retaining the wheel upon the square portion 31 of the shaft 30, thereby preventing rotation of the wheel. Secured to the periphery of the grooved wheel 36, as at 40, is a cable 39 which extends through the bore of the conduit 25 and is secured at its rear end to a pawl 41 which is pivotally mounted, as at 42 within the casing 8 and is located in operative relation with the ratchet 23. A spring 43 is associated with this pawl 41 and operates for normally retaining the latter out of engagement with the ratchet 23.

A second conduit 44 communicates with the casing 8 at its rear end and extends forwardly and upwardly to terminate in proximity to the end of the conduit 25. A cable 45 extends through this conduit 44 and is connected to the grooved wheel 36, as at 40. This cable 45 is connected at its rear end to a pivotal cam 46 which is mounted in proximity to the enlarged hub 17 and concentric projection 18 of the drum 15.

An arm 47 is formed integrally with the U-shaped bracket 27 secured to the dash board 26 and is employed for rotatably supporting a sheave 48 upon which a relatively short cable 49 is arranged. This cable is intended to be connected at its outer end to the cable 45 and at its inner end to the shank 50 of a plug which is provided with a flange 51, adapted for flushly engaging the front face of the dash board 26 when not in operation, and an operating ring 52. This plug may be pulled outwardly of the dash board for drawing upon the cable 45.

When the cable 19, with its spike 20, are arranged as illustrated in Fig. 1, a removable cap 53 is intended to be mounted upon the outer end of the tubing 11 for closing the bore of the latter and for concealing the point of the spike 20.

When the operator of the automobile having this apparatus attached thereto desires to pull the vehicle out of a mud-hole or the like, the cap 53 carried by the outer end of the tubing 11 should be removed for permitting the elbow 54 to be attached thereto. This elbow has its outer wall cutaway, as at 55 for permitting the spike 20 to pass around the bend of the said elbow. In Fig. 2, the spike 20, with its cable 19 have been illustrated as withdrawn from the tubing 11 and conduit 9 and the spike 20 has been driven into the ground G rearwardly of the front axle 13. It is to be understood that the cable 19, as illustrated in Fig. 2, has been entirely unwound from the drum 15. The operator should then connect his engine with the rear axle 6 in such a manner that the latter will operate for driving the vehicle to the rear. The plug having the operating ring 52 should then be pulled outwardly of the dash board 26, by this ring, for drawing upon the cable 45. This movement of the cable 45 will pivot the cam 46 for causing the same to engage the hub 17 and projection 18 of the drum 15 for moving the lugs 16 into engagement with the cooperating lugs 24. It will now be seen that the drum has been locked to the shaft 6 and that rotation of the latter will wind the cable 19 upon the drum for moving the vehicle rearwardly, thereby removing the rear wheels from the mud-hole. It is to be understood that the elbow 54 may be dispensed with and the cable 19 with the spike 20 extended forwardly of the front axle 13. When the spike 20 is in front of the vehicle, the rear axle should be driven for moving the automobile forwardly thereupon winding the cable 19 upon the drum 15 for moving the rear wheels out of the mud-hole.

During the travel of the vehicle over a highway, the driver may withdraw the plug 51 from the dashboard for drawing upon the cable 45 to cause the drum 15 to be shifted toward the pawl 23 for intermeshing the lugs 16 and 24 to lock the drum upon the rear axle 6. Further movement of the rear axle will cause the cable 19 to be wound upon the drum for moving the spike 20 longitudinally inwardly through the tubing 11 thereby compressing the spring 21. The spike 20 will be permitted to move through the tubing 11 until its head engages the completely compressed spring 21 which is prevented from moving bodily by the shoulder 12. The spike will then be held against further movement and the rear axle will be locked.

When the operator of the automobile desires to leave his vehicle parked, he may employ the element illustrated in Figs. 7 and 10. This element comprises a stem 56 carrying a knob 57 at one end and a pair of spaced arms 58 at the other end. The outer end of each of these arms 58 is provided with a cross arm 59 which projects laterally from each side of the said arm 58. The inner face of the grooved wheel 36 is provided with a pair of arcuate recesses 60 having lateral projections 61 which do not open outwardly through the face of the wheel 36. By inserting the arms 58 of the operating element through the opening 34 formed in the dashboard 36, the cross arms 59 may be placed within the recesses 60 formed in the grooved wheel 36. By slightly rotating this operating element, the cross arms 59 will be received within diametrically opposed extensions 61 and the wheel may then be moved longitudinally of the shaft 30 for disengaging the squared bore of the wheel from the squared portion 31 of the shaft. This wheel may then be rotated counter-clockwise for causing the cables 39 and 45 to be wound upon the said wheel. This movement of the cables 39 and 45 will cause the pawl 41 to be moved into operative relation with the ratchet 23 and the cam 46 to be moved into engagement with the hub 17 and the projection 18 for moving the clutch lugs 16 into engagement with the lugs 24. After the pawl 41 and cam 46 have been moved into these positions, the wheel may be allowed to move back upon the squared portion 31 of the shaft for preventing rotation of the said wheel. It will now be seen that the drum 15 will be prevented from rotating free of the axle 6 and that the pawl 41 will prevent rotation of this axle in one direction. It will now be seen that should a person, not owning the automobile equipped with this apparatus, endeavor to move the vehicle forwardly, the drum 15 would wind the cable upon itself for moving the head of the spike 20 inwardly for compressing the spring 21. After this spring has been fully compressed, further movement of the vehicle to the front would be prevented. The unauthorized person attempting to drive the vehicle would be prevented from moving the same to the rear by the pawl 41. It, therefore, will be seen that this device may be employed for locking the automobile to prevent an unauthorized person from stealing the same.

It is now believed that the construction of the various elements and the manner of assembling the same will be understood from the above detail description, also that the various ways of employing this apparatus have been clearly disclosed so that any vehicle driver could successfully use the same.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. The combination with a motor vehicle having a rear axle, of a clutch element rigidly mounted on said axle, a drum having a clutch element loosely mounted on said axle, a cable wound on said drum and projecting longitudinally of said vehicle, a cam element mounted in proximity to one end of said drum, means for pivoting said cam element for causing the drum to move with its clutch element into engagement with the clutch element fixed to said axle for causing the drum to rotate with the latter, and means associated with the free end of said cable for limiting the winding of the latter upon said drum to provide a brake for said vehicle.

2. The combination with a motor vehicle having a rear axle, of a casing closing a portion of said axle, a clutch element rigidly mounted on said axle within the casing, a drum having a clutch element loosely mounted on the axle within the casing, a conduit communicating with said casing and projecting longitudinally of the vehicle, a cable wound on said drum and projecting longitudinally through said conduit, means for moving the drum with its clutch element into engagement with the clutch element fixed to said axle for causing the drum to rotate with the latter for winding the cable upon the drum, and means associated with the free end of said cable and the outer end of said conduit for preventing the withdrawal of the cable from the conduit by being wound upon the drum whereby a braking means is provided for the rear axle.

3. The combination with a motor vehicle having a rear axle, of a unitary structure including a ratchet and a clutch element rigidly mounted on said axle, a drum having a clutch element loosely mounted on said axle, a pivoted pawl operatively associated with the ratchet, a pivoted cam operatively associated with said drum, a cable wound on said drum and projecting longitudinally of said vehicle, means associated with the free end of said cable for limiting the winding of the latter upon said drum, and means for moving the pawl into operative engagement with the ratchet for preventing rotation of the axle in one direction and for moving the cam to place the clutch element on said drum into engagement with the clutch element on said ratchet for winding the cable on the drum whereby said axle will be prevented from rotating in the opposite direction.

4. The combination with a motor vehicle having a rear axle, of a casing enclosing a portion of said axle, a unitary structure including a ratchet and a clutch element rigidly mounted on said axle within the casing, a drum having a clutch element loosely mounted on said axle within the casing, a pivoted pawl carried by said casing in operative relation with the ratchet, a pivoted cam operatively associated with said drum and carried by said casing, a cable wound on said drum and projecting outwardly of said casing, means associated with the free end of said cable for preventing the drawing of said end into said casing, and means for moving the pawl into operative engagement with the ratchet for preventing rotation of the axle in one direction and for moving the cam to place the clutch element on said drum into engagement with the clutch element on said ratchet for winding the cable on the drum whereby said axle will be prevented from rotating in the opposite direction.

5. The combination with a motor vehicle having a rear axle, of a unitary structure including a ratchet and a clutch element rigidly mounted on said axle, a drum having a clutch element loosely mounted on said axle, a pivoted pawl operatively associated with the ratchet, a pivoted cam operatively associated with said drum, a cable wound on said drum and projecting longitudinally of said vehicle, means associated with the free end of said cable for limiting the winding of the latter upon said drum, a cable connected to the pawl adapted for operating the same to move it into engagement with the ratchet for preventing rotation of the axle in one direction, a cable connected to the cam adapted to operate the latter for placing the clutch on said drum into engagement with the clutch element on said ratchet for winding the cable on the drum, and means connected to the cables leading to the pawl and the cam for operating the same in unison.

6. The combination with a motor vehicle having a rear axle, of a casing enclosing a portion of said axle, a unitary structure including a ratchet and a clutch element rigidly mounted on said axle within the casing, a drum having a clutch element loosely mounted on said axle in the casing, a pivoted pawl operatively associated with the ratchet and carried by one wall of said casing, a pivoted cam operatively associated with said drum and carried by one wall of said casing, a tapered conduit communicating with said casing and extending longitudinally of said vehicle, a cable wound upon said drum and projecting longitudinally through said conduit, means carried by the free end of the cable for preventing it from being drawn into said conduit, a pair of conduits communicating with said casing and extending longitudinally of the first mentioned conduit, a cable within each of the last mentioned conduits connected to the pawl and the cam, and means connecting the last two mentioned cables for operating the pawl and cam in unison for preventing rotation of the rear axle in either direction.

In testimony whereof I affix my signature.

JOHN KREITZER.